March 17, 1959     W. S. SWANSON ET AL     2,877,676

WORK LOADING LATHE

Filed Sept. 15, 1954     6 Sheets-Sheet 1

Fig. 2

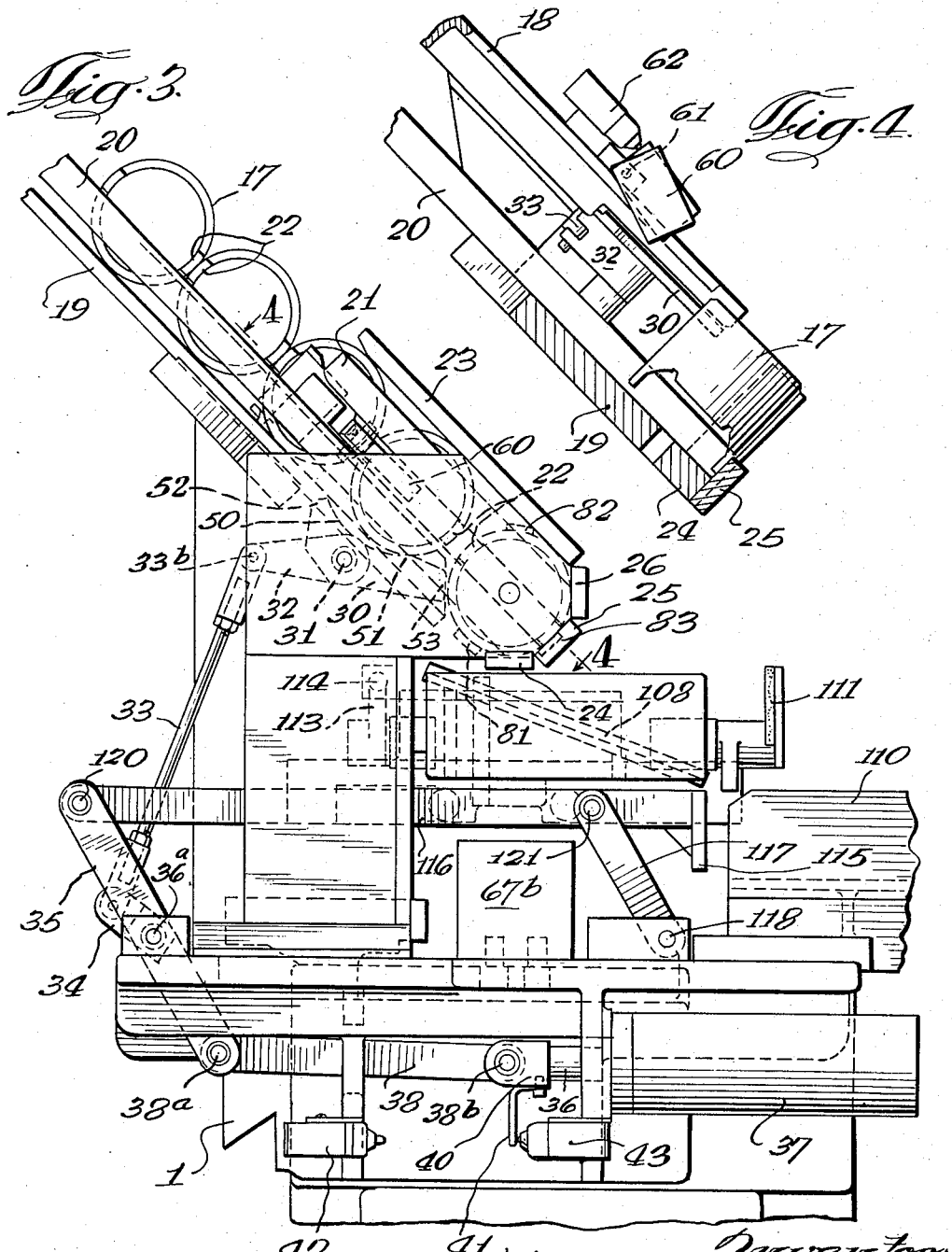

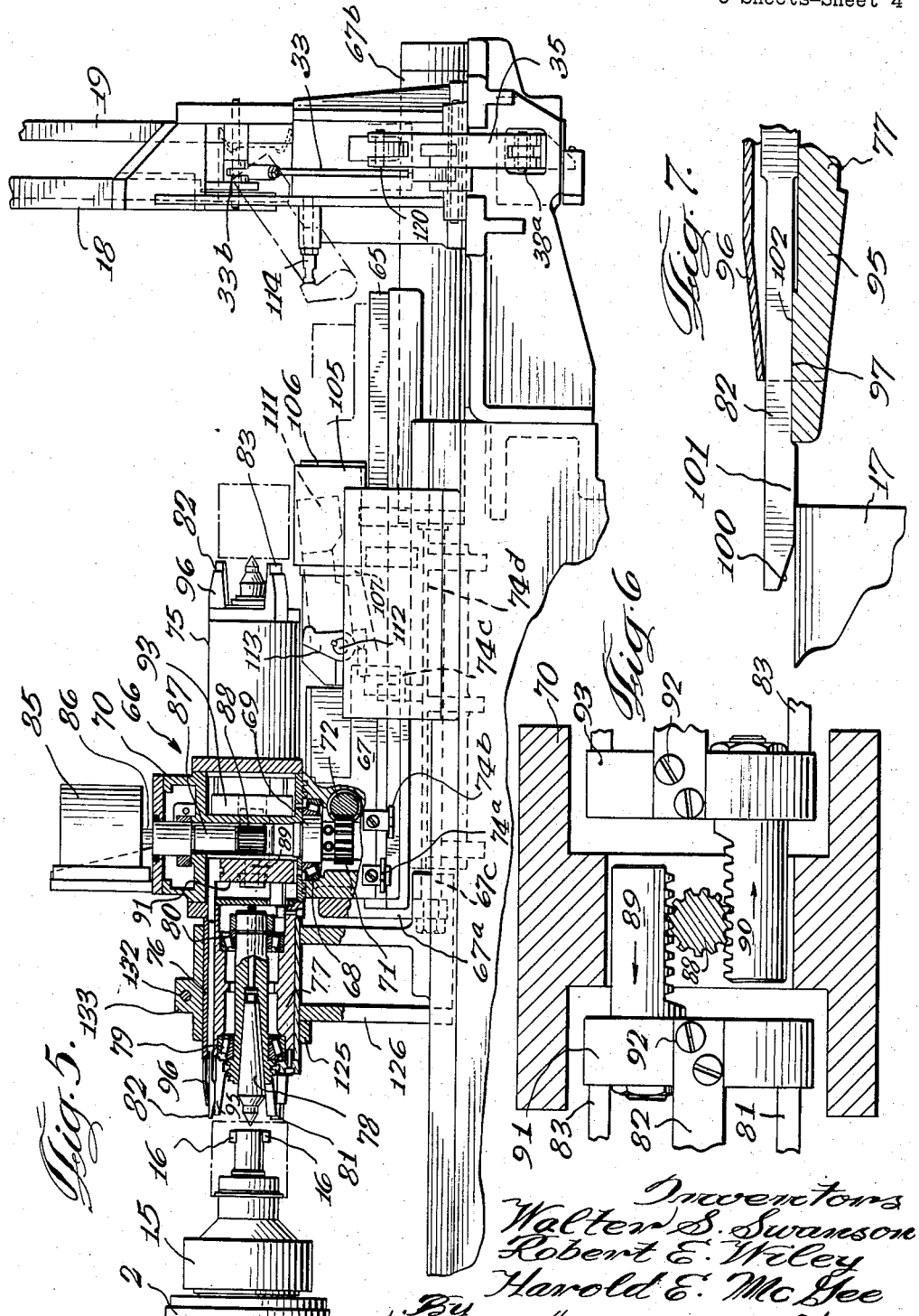

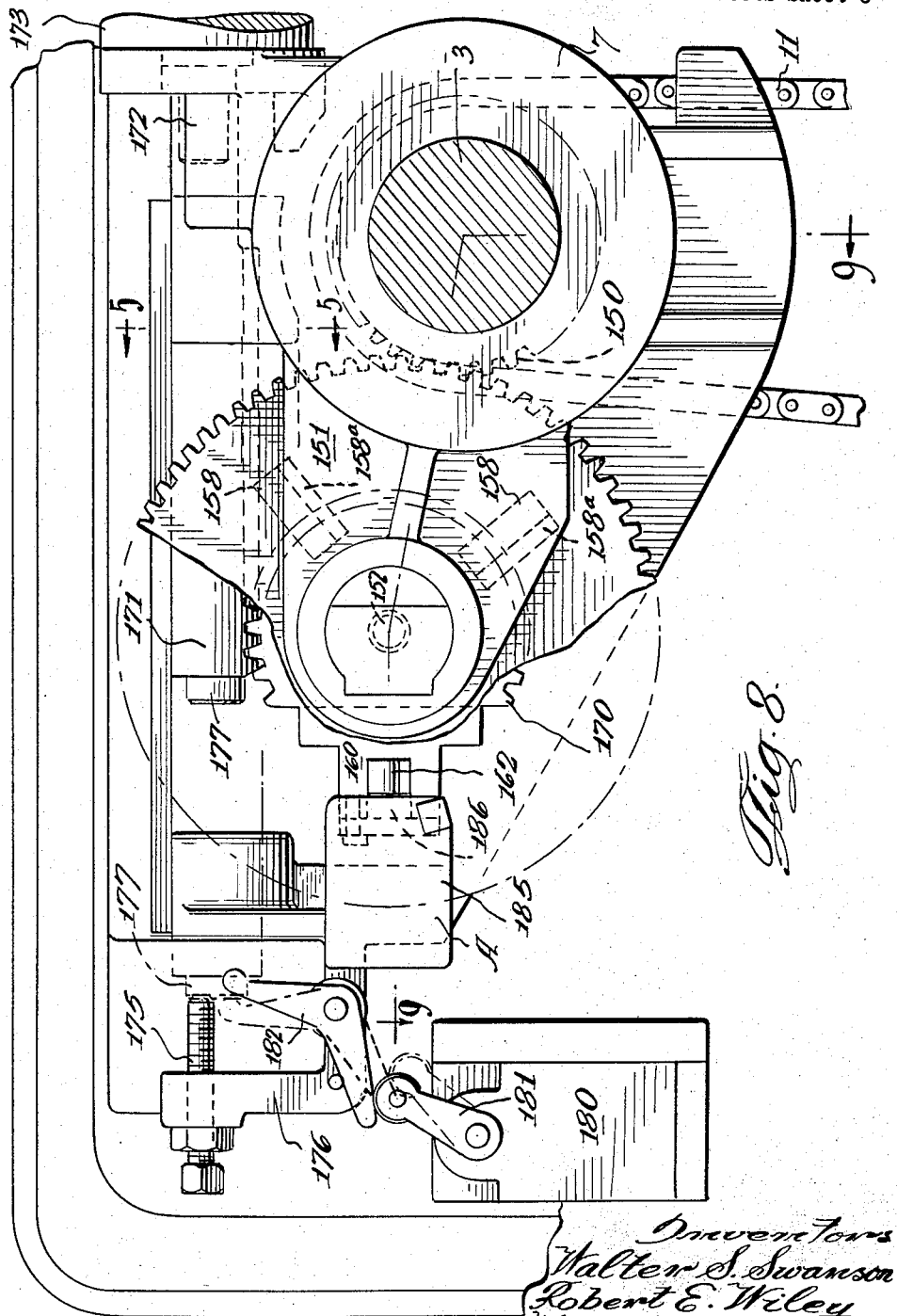

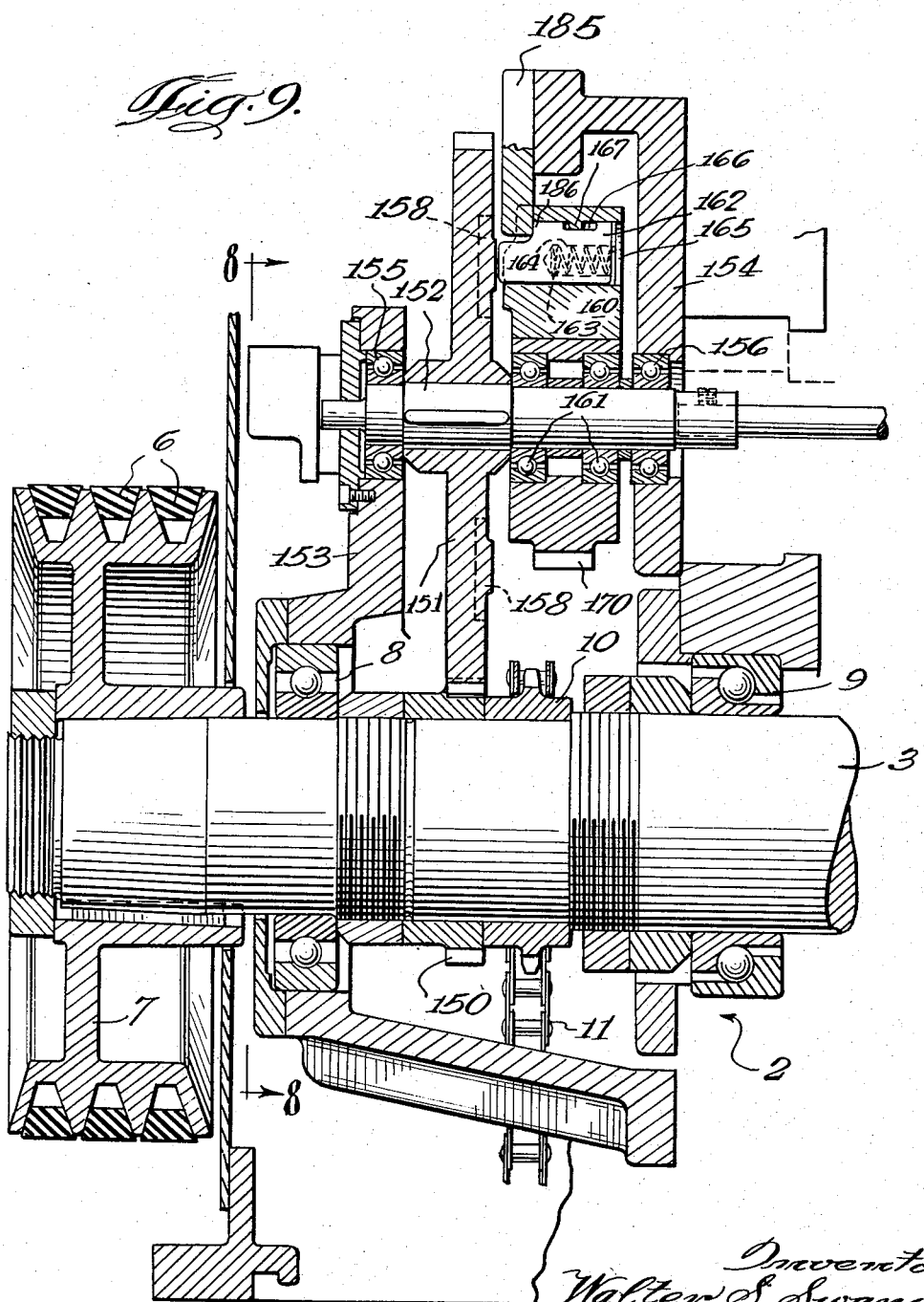

United States Patent Office 2,877,676
Patented Mar. 17, 1959

2,877,676

WORK LOADING LATHE

Walter S. Swanson, Robert E. Wiley, and Harold E. McGee, Rockford, Ill., assignors to Sundstrand Machine Tool Co., a corporation of Illinois Application September 15, 1954, Serial No. 456,096

15 Claims. (Cl. 82—2.7)

This invention relates to a work loading lathe and, more particularly, a work loading lathe provided with a duplex tailstock loading head.

An object of this invention is to provide a new and improved work loading lathe.

Another object of this invention is to provide a new and improved work loading lathe having a headstock with a spindle at one end and a loading cradle at the other end of the lathe concentric with said spindle, and a movable and indexible loading head positioned between the headstock and the loading cradle and provided with duplicate tailstock extensions at opposite ends thereof provided with fingers, each of said tailstock extensions functioning alternately to take a work piece from the loading cradle, present the work piece to the spindle driver and hold the work piece on the spindle driver as it is being machined and then releasing the work piece at a discharge position while the other tailstock extension performs a work loading cycle.

Another object of this invention is to provide a work loading lathe as defined in the preceding paragraph wherein the fingers associated with both of the tailstock extensions are mounted for sliding movement between an extended work-engaging position and a retracted position, are interconnected for simultaneous movement and concentrically arranged and positioned about the periphery of the extensions so that they slide onto a rough piston and are constructed so that they avoid contact with a finished work piece as they are extended and then move radially inward into engagement with the finish work piece in order to prevent damage to the work piece.

A further object of the invention is to provide a work loading lathe having a loading head movable between a source of work pieces and a position adjacent a headstock having a spindle, said loading head having a pair of oppositely extending tailstock extensions and associated work-engaging fingers for holding a work piece as the work piece is shifted by the loading head from the source of work pieces to the headstock and from the headstock to a discharge position, means for shifting the fingers associated with each tail stock simultaneously in oppositely directions whereby as the fingers are withdrawn from a work piece positioned on the spindle, the other set of fingers is withdrawn from a finished work piece carried by the other tailstock, a discharge tray mounted on the loading head for receiving a finished work piece as it is released by one set of fingers and holding the work piece until the discharge tray is aligned with a collector tray adjacent the source of work pieces, and means operative when the discharge tray is adjacent the collector tray to permit movement of a work piece from the discharge tray into the collector tray.

Another object of the invention is to provide in a work loading lathe, a loading chute for supporting a source of work pieces for supply thereof one by one to a loading cradle and mechanism to accurately position a work piece in the loading cradle whereby it may be picked up by mechanical fingers on a loading head and transported to the head stock of the lathe including a pawl pivotally mounted adjacent the underside of the loading chute and adjacent the loading cradle and having a first position wherein it blocks a work piece immediately above the cradle from movement into the cradle and aids in accurately positioning a work piece in the cradle and a second position wherein it blocks work pieces immediately above the work piece adjacent the cradle from descending in the chute while permitting movement of the lowermost work piece in the chute into the loading cradle.

Yet another object of the invention is to provide mechanism in a work loading lathe for indexing the spindle to a predetermined position whereby the work engaging means on the spindle will properly engage the work piece as it is placed on the head stock by the work loading mechanism.

Another object of the invention is to provide a mechanism for indexing a headstock spindle to a predetermined position as defined in the preceding paragraph wherein a control shaft extending parallel to and spaced from the spindle shaft has a first gear mounted thereon in engagement with a second gear secured to the spindle shaft, the ratio between the gears being such that a quarter revolution of said first gear produces a half revolution of the spindle, means defining four notches on the inner face of said first gear equally spaced from each other and from said control shaft, a pawl carrier oscillatably mounted on said control shaft for movement between initial and terminal positions and having a spring-urged pawl directed outwardly into engagement with the inner face of said first gear, a stationary cam plate positioned to hold the pawl out of engagement with the inner face of said first gear when the pawl carrier is in its initial position and permitting movement of the pawl into engagement with the inner face of said first gear when the pawl carrier moves from its initial position, means for rotating the pawl carrier to move the pawl in an arcuate path to a terminal position, said pawl during its movement engaging with one of said notches to carry the first gear to the terminal position and thus position the spindle shaft and means for predetermining the terminal position of the pawl carrier.

The objects of the invention generally set forth, together with other ancillary advantages, are attained by the construction and arrangement shown by way of illustration in the accompanying drawing, in which:

Fig. 2 is a plan view of the lathe with the loading head at the work loading position;

Fig. 3 is a fragmentary end view in elevation of the lathe looking at the right hand end of Fig. 1;

Fig. 4 is a plan section taken along the line 4—4 in Fig. 3;

Fig. 5 is a fragmentary front elevational view of the lathe with parts in section and the loading head at the work loading position with the fingers withdrawn.

Fig. 6 is a diagrammatic enlarged plan view of the finger shifting mechanism shown in Fig. 5;

Fig. 7 is a fragmentary sectional view showing one of the work-engaging fingers in its extended position;

Fig. 8 is a fragmentary side view in elevation looking at the left hand end of the lathe as shown in Fig. 1 with parts broken away and taken along the line 8—8 in Fig. 9; and, Fig. 9 is a sectional view taken along the line 9—9 in Fig. 8.

Figure 1:
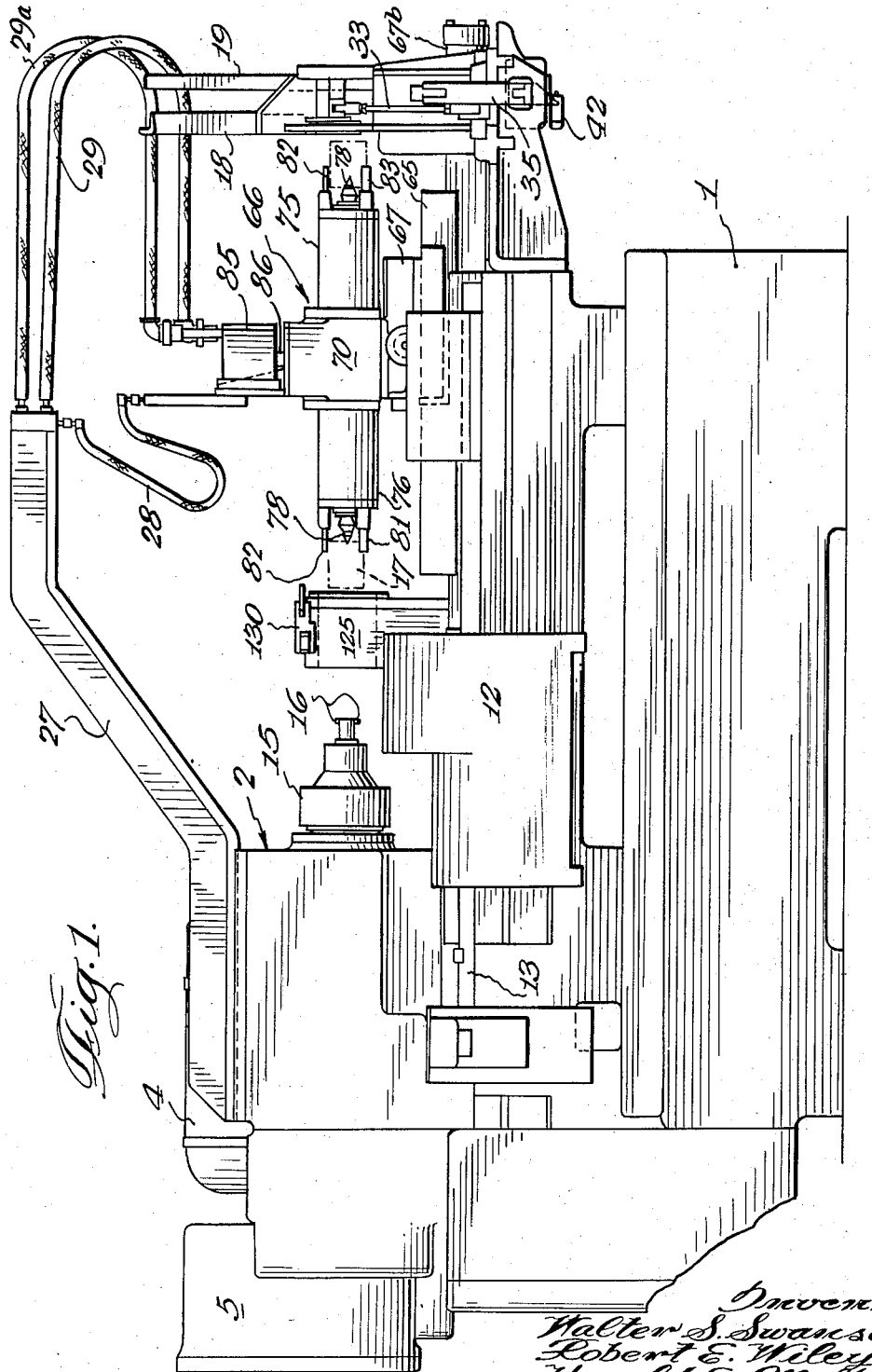
Fig. 1 is a side elevational view of the work loading lathe with the loading head at the index position.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

The lathe as shown in the drawings comprises a bed 1 upon which is mounted a headstock 2 having a spindle shaft 3 (Fig. 9) which is driven by a motor 4 through a clutch and brake unit 5 which drives a series of belts 6 (Fig. 9) which pass around a pulley 7 secured to the spindle shaft 3.

The spindle shaft 3 is mounted for rotation in the headstock 2 by bearings 8 and 9 and has a sprocket 10 secured thereto which drives a feed drive chain 11 for imparting feed movement to a carriage 12 through a feed shaft 13 which is adapted to carry a front tool slide and tooling (not shown).

The spindle 3 has a driver 15 connected thereto which is provided with a pair of drive lugs 16 which are constructed to engage with interfitting parts on a work piece 17 which, as herein disclosed, may be in the form of a piston.

Extending outwardly and upwardly away from the headstock 2 is an overhead support 27 carrying hydraulic lines which connect with lubricant hose 28 and hoses 29 and 29a, the function of which will be more fully described hereinafter.

Figure 2:
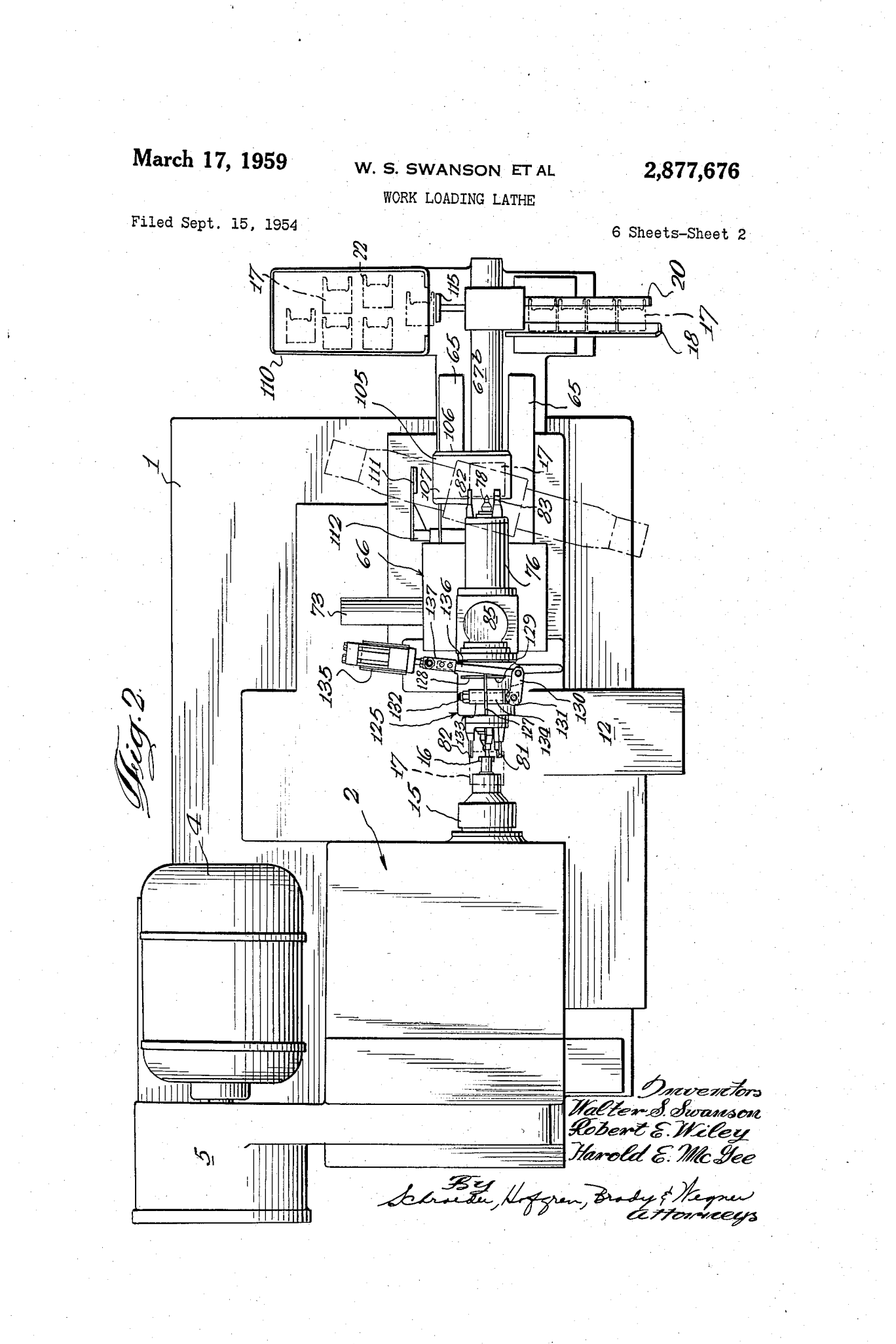

At the right hand end of the lathe, as viewed in Figs. 1, 2 and 5, mechanism is provided for holding a series of rough work pieces 17 and comprises an inclined loading chute having lower members 18 and 19 upon which the work pieces rest. The member 18 is L-shaped so that in conjunction with a side bar 20, the work pieces are confined against lateral movement in the loading chute. An additional side bar 21 is provided near the lower end of the loading chute spaced from the side bar 20 and acts to confine the flanges 22 on the work pieces in order to properly guide them in their downward travel in the chute. A top member 23 engages the upper side of the work pieces in order to prevent their inadvertent upward movement by a pawl mechanism described hereinafter.

At the bottom of the loading chute, a group of members 24, 25 and 26 form a loading cradle concentric with the driver 15 which supports a work piece in position to be removed and transferred onto the driver 15 for machining thereof.

In order to positively control the movement of a work piece onto the loading cradle and to insure that the work pieces move singly into the cradle, a pawl 30 is provided immediately beneath the loading chute and adjacent the loading cradle and is mounted for oscillating movement on a shaft 31. The pawl is movable between two positions by an arm 32 which is pivotally connected to a link 33 by a pin 33b. The link 33 is pivotally connected to an arm 34 which is welded to an arm 35 pivoted at 36a to the bed of the machine. The arm 35 is connected to a piston rod 36 of a hydraulic cylinder 37 by a connecting link 38 and connecting pins 38a and 38b. Thus, as the piston rod 36 is shifted, the pawl 30 will be shifted. A member 40 between the piston rod 36 and the connecting link 38 carries a depending plate 41 which may engage either of switches 42 or 43 for indicating that the pawl has moved to one or the other of its limit positions and to thus indicate the presence of a work piece 17 in the cradle.

The pawl 30 has an arcuate upper surface 50 which terminates with a raised portion 51 forming a stop surface and has at one end a projection 52 which also functions as a stop surface. The end 53 of the pawl opposite the end 52 in one position of the pawl engages the work piece 17 placed in the cradle to position the work piece properly against the members 24, 25 and 26.

Thus, it will be seen that in one position of the pawl 30 the stop surface 51 prevents a work piece in the loading chute immediately above the loading cradle from moving into the cradle while the surface 53 of the pawl is properly locating a work piece in the cradle. As the pawl moves in a clockwise direction looking at Fig. 3 to its other position, the arcuate surface 50 of the pawl will permit a work piece immediately above the cradle to move into the cradle while the stop surface 52 on the pawl will move into blocking position to prevent movement of other work pieces down the chute. As the pawl moves in the other direction, the stop surface 52 will lower and permit a work piece to move down to a position adjacent the cradle.

As shown in Fig. 4, a plate 60 is pivotally mounted by a pin 61 adjacent the loading chute and is normally urged to a position in the path of work pieces in the chute. So long as there are work pieces in the chute the plate 60 will be held in its outer-most position and will contact an operating button of a switch 62 to indicate that work pieces are available for machining by the lathe.

Positioned on the bed 1 are ways 65 upon which a base member 67 is slidably mounted. A duplex tailstock loading head indicated generally at 66 is rotatably mounted on the base member 67. The base member 67 has a downwardly extending plate 67a which is connected to a hydraulic piston and cylinder 67b by a rod 67c for moving the duplex tailstock loading head 66 back and forth between its various positions.

The base member 67 supports by means of an upper thrust bearing 68 and a lower thrust bearing, not shown, a vertical shaft 69 which extends upwardly into a cylindrical opening within a central housing 70 of the loading head 66. The upper end of the vertical shaft 69 is keyed to the central housing 70 so that rotation of the vertical shaft 69 will rotate the loading head 66. The vertical shaft 69 has a pinion 71 engaged by a rack 72 which is movable by a hydraulic piston and cylinder 73 to index the loading head 180° with each movement of the rack 72. The rack 72 may engage stops (not shown) to determine definitely its limits of movement and thus accurately control the positioning of the loading head 66.

The loading head 66 may be moved between the positions shown in Figs. 1 and 2 by the piston and cylinder 67b and will also be positioned at a work receiving position to the right of the position shown in Fig. 1. A set of dogs 74a, 74b and 74c operate switches carried on a panel 74d to indicate the proper positioning of the loading head 66.

The central housing 70 has oppositely extending cylindrical tailstock extensions 75 and 76 in the form of sleeves which enclose the mechanism shown in Fig. 5. Each of the cylindrical extensions are of similar construction and each has a hollow core 77 in which a conventional live center 78 is rotatably mounted by means of thrust bearings 79 and 80.

A plurality of movable fingers formed from a material having spring characteristics such as spring steel are positioned between the hollow core 77 and the sleeves 75 and 76.

There are three fingers 81, 82 and 83 associated with each of the tailstock units 75 and 76 (Figs. 3 and 5).

The fingers 81, 82 and 83 associated with the tailstock units are mounted for movement between a retracted position as shown in Fig. 5 wherein they are free of engagement with a work piece and an extended work-engaging position, as shown in Figs. 1 and 2, wherein they engage a work piece. The fingers mounted in one cylindrical tailstock extension move between extended and retracted positions simultaneously with the fingers carried by the other cylindrical tailstock extension.

The means for shifting the fingers simultaneously in opposite directions includes a commercially available hydromotor 85 supported on top of the central housing 70 which rotates a downwardly extending shaft 86 having an extension 87 provided with a pinion 88 meshing on opposite sides with a pair of oppositely extending racks 89 and 90. The rack 89 is attached to a cylindrical disk 91 which has the inner ends of the fingers 81, 82 and 83 attached thereto by means such as screws 92. The rack 90 is attached to a cylindrical disk 93 which has the other set of fingers 81, 82 and 83 attached thereto by means such as screws 92.

The hydromotor 85 receives fluid from pressure source through the line 29 and connects to tank through line 29a, both previously described.

As shown in Fig. 7, each of the hollow cores 77 have extensions 95 for guiding the fingers 81, 82 and 83 in their movement and the outer edge of the fingers are covered by chip guards 96.

Each of the fingers 81, 82, and 83 is provided with a cam portion 100, a work-engaging portion 101 and a relieved portion 102 inwardly of the work-engaging portion 101. As the fingers are extended into engagement with a rough work piece 17, they will be flexed outwardly by the cam portion 100 of the fingers until the work-engaging portion 101 rides onto the work piece. A work piece 17, when machined or finished, has a smaller diameter than a rough work piece and it is desired that the fingers not slide on a finished work piece so that the extensions 95 for guiding the fingers are provided with outer ends 97 lying in a circle having a diameter slightly greater than that of a finished work piece and less than that of a rough work piece which cooperate with the work-engaging portions 101 of the fingers to hold the fingers out of engagement with a finished work piece until the fingers are fully extended at which time the fingers move radially inward a slight distance into engagement with the work piece because of the inward movement permitted by the relieved portion 102 of the fingers. The engagement of a finger with a finished work piece 17 is shown in Fig. 7.

A discharge tray 105 is mounted on the base member 67 for the loading head 66 and travels with the loading head so that it may receive a finished work piece when the fingers 81, 82 and 83 disposed thereover are retracted simultaneously with the retraction of the fingers holding a rough work piece mounted on the driver 15. The discharge tray 105 is formed with confining sides 106 and 107 and an inclined bottom 108 leading to an open discharge end at the rear of the base member 67. The discharge tray 105 functions to store a finished work piece until such time as the discharge tray is positioned over and aligned with a collector tray 110 secured to the bed 1 at the loading and unloading end of the lathe as shown at the right hand end of Figs. 1, 2 and 5.

In order to hold a finished work piece in the discharge tray until it is positioned over the collector tray, a pivotally mounted stop plate or gate 111 is positioned adjacent the open end of the discharge tray and is secured to a shaft 112 pivotally mounted in the base member 67 of the loading head. This shaft has at its end opposite the stop plate 111 a trip lever 113 adapted for engagement with an adjustable pin 114 secured to the bed of the machine in a position to cause pivoting of the shaft 112 and raising of the stop plate 111 as the loading head 66 approaches its loading-unloading position adjacent the loading cradle. The raising of the stop plate 111 as shown in broken line in Fig. 5 permits a work piece to fall into the collector tray 110. In order to insure space in the collector tray 110 for receiving a work piece, a pusher plate 115 (Fig. 3) is mounted on the bed of the machine. This pusher plate is formed at the end of a bar 116 which is supported for back and forth movement by the arm 35 and a pivotal link 117 secured to the bed by a pin 118. The bar 116 is connected to the arm 35 and link 117 by pins 120 and 121, respectively, and is moved simultaneously with the pawl 30 by means of the hydraulic cylinder 37.

In order to rigidly support a tailstock unit and its associated center 78 while the center is in engagement with a work piece 17 mounted on the driver 15, a clamping collar indicated generally at 125 is secured to the bed of the machine at a position adjacent the driver. The collar 125 has an upstanding base 126 terminating in an annular collar which is slit along its length at 127 and transverse to its length at 128 and 129 to impart flexibility thereto. The split portions of the collar may be loosened and tightened by means of a lever 130 having a cam surface 131 on an end thereof which in different positions acts to move the portions of the collar toward and away from each other. The cam end of the lever 130 may be pivoted at one end of a bolt 132 which passes through ears 133 and 134 formed on the upper side of the split portions of the collar. The lever 130 is pivoted by means of a hydraulic cylinder 135 having its piston rod connected to a link 136 by a lost motion connection 137 which causes actuation of the lever 130 with a sharp blow to cause release of the cam 131 from the ear 134.

It is believed that the operation of the previously described mechanism will be apparent. However, the operation may be briefly stated as follows:

With a work piece 17 mounted on the driver 15, the tail center 78 associated with one of the tailstock extensions 75 or 76 is in supporting engagement with the work piece, and the fingers 81, 82 and 83 are in their retracted position. For purposes of description, assume that it is tailstock extension 76 as shown in Figs. 2 and 5. The machining of the work piece on the driver then proceeds until completion. Upon completion of the machining, the fingers 81, 82 and 83 are extended to a point where the work-engaging portions 101 thereof move off the ends 97 of the extensions 95 which permits the fingers to move radially inward and into engagement with the finished work piece without sliding thereon. Simultaneously, the fingers at the tailstock end 75 of the duplex loading head 66 are extended to a work-engaging position but do not engage a work piece at the time of their extension.

Upon completion of the extension of the fingers 81, 82 and 83, the tailstock clamp 125 is released by cylinder 135, and the loading head 66 is moved away from a position adjacent the driver 15 to its other limit position by cylinder 67b wherein the extended fingers 81, 82 and 83 on the tailstock extension 75 of the loading head which are not holding a work piece slide onto a rough work piece 17 positioned in the loading cradle formed by the members 24, 25 and 26, the position of the fingers being shown in Fig. 3. As the fingers are already extended, they are caused to cam up on by cam portions 100 and slide on a rough work piece by movement of the entire loading head 66. Thus, at this point in the cycle each set of work-engaging fingers support a work piece. The tailstock 76 has a finished work piece and the tailstock 75 has a rough work piece.

The loading head 66 is then moved to an intermediate indexing position, shown in Fig. 1, and, by broken line in Fig. 2 wherein the loading head 66 has been partially indexed by rotation of the vertical shaft 69. At the indexing position the loading head 66 is indexed by actuation of the cylinder 73 which through the pinion 71 and rack 72 rotates the vertical shaft 69 to rotate the loading head 66 on the base member 67 one-half of a revolution to reverse the positions of the rough and finished work pieces. The loading head 66 is then moved by the cylinder 67b toward the driver 15 to place the rough work piece 17 supported by tailstock 75 thereon. The tailstock clamp 125 is operated to clamp the tailstock. The fingers 81, 82 and 83 holding the rough work piece are then retracted while the center 78 engages the work piece and simultaneously the other fingers 81, 82 and 83 on tailstock 76 holding the finished work piece are retracted which permits the finished work piece to fall off of the center 78 and into the discharge tray 105 where it is held by the stop plate 111.

After completion of the machining operation on the work piece mounted on the driver 15, the fingers 81, 82 and 83 of tailstock 75 are again extended to engage the work piece, the tailstock clamp 125 is released and the loading head 66 is then again returned past the indexing position into a position wherein the extended fingers 81, 82 and 83 on tailstock 76 slide onto a rough work piece in the loading cradle. As the loading head 66 moves to pick up a work piece in the loading cradle, the pin 114 engages the arm 113 to raise the stop plate 111 and permit the finished work piece 17 in the discharge tray 105 to drop into the collector tray 110 which is then positioned underneath.

The work pieces 17 are placed in the loading cradle one by one by the aforementioned pawl mechanism 30.

The position of the work pieces 17 is positively controlled from the time they enter the loading chute until they are placed on the driver 15. The drive lugs 16 on the driver 15 are disposed 180° apart and are adapted to engage certain portions of a work piece. The positioning of the work piece 17 is positively controlled as it is placed on the driver 15, and it is important to insure that the driving lugs 16 are always positioned properly with respect to the work piece so as to insure proper engagement between the drive lugs 16 and the work piece.

In order to accomplish this, it is seen that the spindle 3 may always be in one of two different rotative positions which are 180 degrees apart since in either position the drive lugs 16 will be positioned the same with respect to the work piece.

The means for positioning the spindle 3 in either one of two positions comprises a gear 150 (Figs. 8 and 9) mounted on the spindle shaft 3 for rotation therewith and which meshes with a gear 151 secured to a shaft 152 mounted in frame members 153 and 154 of the machine by ball bearings 155 and 156. The gears 150 and 151 are so proportioned so as to provide a 2–1 ratio between the spindle shaft 3 and the shaft 152. Thus, it will be seen that a quarter revolution of the shaft 152 will produce a half revolution of the spindle shaft 3.

The gear 151 is provided with four radially extending notches 158 on its inner face concentrically arranged around the center of the gear and which are angularly spaced apart equal distances. The notches 152 each have a sloped portion 158a for a purpose more fully set forth hereinafter.

A pawl carrier 160 is disposed adjacent the inner face of the gear 151 and oscillatory mounted on the shaft 152 by ball bearings 161. The pawl carrier 160 carries a slidably mounted pawl 162 which is spring-urged outwardly toward the gear 151 by a spring 163 fitted in an opening 164 in the pawl and which engages against a back plate 165. The pawl 162 is provided with a slot 166 in which is fitted a lug 167 which acts to limit the outward movement of the pawl.

The pawl carrier 160 is formed with a gear segment 170 which meshes with a rack 171 connected to a piston rod 172 extending from a hydraulic piston and cylinder 173. It will thus be seen that movement of the rack 171 towards the left, as shown in Fig. 8, will rotate the gear segment 170 in a counterclockwise direction to cause the pawl carrier 160 to move the pawl 162 in an arcuate path in a counterclockwise direction.

The pawl 162 will engage with one of the notches 158 and rotate the gear 151 and through the gear 150 rotate the spindle shaft 3. The final position of the spindle shaft 3 to properly orient the drive lugs 16 may be accomplished by accurately controlling the terminal position or end limit of movement of the pawl carrier 160. This is accomplished by the threaded member 175 mounted in a fixed bracket 176 which functions as a stop for the rack 171 by engaging a cushion member 177 on the end thereof, the initial position of the rack 171 being shown in full line and its final position being shown in broken line in Fig. 8. The threaded member 175 may be adjusted by rotation thereof to vary the stop position of the rack 171 and thus vary the terminal position of the pawl carrier 160.

It will thus be seen that the pawl 162 during its movement in an arcuate path will pick up one of the notches 158 and carry the gear 151 therewith to a position determined by the threaded member 175, the threaded member 175 being set so that when the rack 171 is stopped, the driving lugs 16 on the driver 15 will be properly oriented. A switch 180 having an operating arm 181 may be operated by a bell crank 182 engageable with the end of the rack 171 to indicate completion of the spindle indexing operation.

During the machining operation of the work piece 17 the spindle shaft 3 will be rotating which through the gear 150 will cause rotation of the gear 151. It is thus desirable to cause the pawl 162 to be in a position wherein it will not engage with the gear 151 during the rotation of the gear by the spindle shaft 3. A cam plate 185 is secured to the frame member 154 and engages with a surface 186 on the pawl 162 to hold the pawl 162 out of engagement with the gear 151 when the pawl carrier 160 is in its initial "at rest" position. When the rack 171 is moved to rotate the pawl carrier 160, the surface 186 of the pawl will ride off the cam 185 and will then be urged outwardly by the spring 163 into a position to move into one of the notches 158. When the rack 171 is moved in the other direction, the pawl carrier 160 will be rotated in a clockwise direction, looking at Fig. 8, and the pawl 162 will move out of a notch 158 along its sloping surface 158a and will then contact a slope on the cam plate 185 and move to a withdrawn position, against the action of spring 163.

It will be seen from the foregoing that the rotation imparted to the pawl carrier 160 by the rack 171 is greater than a quarter revolution and, since there are four notches 158 in the gear 151, the pawl 162 will always engage with a notch 158 during movement of the pawl carrier 160 and move the notch 158 and gear 151 to a position determined by the threaded member 175. The use of four notches 158 in the gear 151 along with 2–1 ratio between the spindle shaft 3 and the shaft 152 insures that the spindle shaft 3 will always end up in either of two rotative positions as determined by the position of the threaded member 175. Thus, the drive lugs 16 will always be properly positioned to engage with a work piece 17 placed on the driver 15.

We claim:

1. A work loading lathe comprising, a bed provided with horizontal ways, a headstock provided with a spindle including a driver for receiving a work piece, a holder for rough work pieces adjacent one end of the lathe, said holder including a loading cradle concentric with the spindle, a base member slidably mounted on the horizontal ways on the bed of the lathe for movement between one limit position adjacent the loading cradle and another limit position adjacent the head stock and having an intermediate index position, an upstanding duplex tailstock loading head mounted on the base member and having a pair of generally cylindrical tailstock extensions extending horizontally outwardly therefrom in diametrically opposite directions, each of said extensions including a live center and a plurality of work holding fingers all of the fingers being mounted for simultaneous movement in a direction parallel to the center axis between an extended work-engaging position and a retracted position and disposed concentrically around their associated live center, means for indexing the loading head on its base member about a vertical axis one-half revolution to present alternate tailstocks to the spindle, a tailstock clamp mounted on the bed adjacent the driver for clamping a tailstock extension while a work piece is supported thereby during machining thereof, and means for shifting the loading head between its limit positions and index position whereby a finished work piece may be held by one tailstock extension while a rough work piece is engaged by the other of said centers and held by the associated extended fingers and removed from the loading cradle and by indexing of the loading head one-half revolution and by movement thereof along its supporting ways placed on the spindle driver, the fingers holding the rough work piece being retracted to permit rotation of a work piece by the driver and the simultaneous movement of the fingers holding the finished work piece causing release thereof.

2. A lathe as defined in claim 1, wherein the fingers are mounted for sliding movement against a hollow core in which said live center is mounted and disposed from the live center a distance whereby they define a circle having a diameter slightly greater than the diameter of a finished work piece and slightly less than the diameter of a rough workpiece, said fingers being composed of material having spring characteristics and biased outwardly by said hollow core, means at the end of each finger forming a cam surface so that as the fingers are extended over a rough work piece by movement of the loading head they will be cammed onto said work piece, and means on each of said fingers defining a relieved portion inwardly of the work-engaging portion thereof which engages the hollow core when the fingers are extended over a finished work piece and permits radial inward movement of the fingers in order to permit engagement of the fingers with a finished work piece while avoiding sliding engagement between the fingers and finished work piece.

3. In a lathe as defined in claim 1, a collector tray on the bed disposed adjacent the loading cradle for receiving finished work pieces, a discharge tray mounted on said movable base member at a level above said collector tray and movable with the base member for receiving a finished work piece from either of said tailstock extensions disposed thereabove when the fingers are moved to a retracted position, means for holding a work piece in said discharge tray, and means operative when the loading head moves to its limit position adjacent the loading cradle for rendering said holding means inoperative to permit a work piece to drop into the collector tray.

4. A work loading lathe comprising, a bed provided with ways, a rough work piece loading station adjacent one end of the lathe, a base member slidably mounted on the horizontal ways on the bed of the lathe for movement between one limit position at the loading station and another limit position at a work piece machining station and having an intermediate index position, an upstanding loading head mounted on the base member and having a pair of tailstock extensions extending outwardly therefrom parallel to the ways in diametrically opposite directions, each of said extensions including a live center and a plurality of work holding fingers mounted for movement between an extended work-engaging position and a retracted position and disposed concentrically around their associated live center, means for indexing the loading head on its base member about an axis normal to the ways to present alternate tailstocks to the machining station, means for shifting the loading head between its limit positions and index positions whereby a rough workpiece engaged by one of said centers and by the previously extended associated fingers may be engaged at the loading station and by indexing of the loading head and movement thereof along its supporting ways located at the machining station, and means for retracting the extended fingers with the center still in supporting engagement with a work piece at the machining station.

5. In a lathe as defined in claim 4, a collector tray on the bed adjacent the loading station for receiving finished work pieces, a discharge tray having a sloped bottom mounted on said movable base member at a level above said collector tray and movable with the base member for receiving a finished work piece from either of said tailstock extensions disposed thereabove when the fingers are moved to a retracted position, a movable stop gate for holding a work piece in said discharge tray, and means operative when the loading head moves to its limit position adjacent said loading station for raising said stop gate to permit a work piece to roll out of the discharge tray into the collector tray.

6. A work loading lathe comprising, a bed provided with ways, a headstock provided with a spindle including means for supporting a work piece, a holder for rough work pieces including a loading cradle concentric with the spindle adjacent one end of the lathe, a base member slidably mounted on the ways on the bed of the lathe for movement between one limit position adjacent the loading cradle and another limit position adjacent the headstock and having an intermediate index position, a loading head mounted on the base member and having a pair of work-holding extensions extending outwardly therefrom in diametrically opposite directions, each of said extensions including a plurality of concentrically arranged work holding fingers, means for indexing the loading head on its base member about an axis normal to the plane of said ways to present alternate work-holding extensions to the spindle, and means for shifting the loading head between its limit positions and index position whereby a rough work piece held by the fingers on one work-holding extension may be removed from the loading cradle and by indexing of the loading head one-half revolution and by movement thereof along its supporting ways placed on the work piece supporting means.

7. In a lathe as defined in claim 6, means mounted on said base member and movable with the base member for receiving a finished work piece from either of said work-holding extensions disposed thereabove, means for holding a work piece in said work piece receiving means, means disposed adjacent the loading cradle and at a level beneath the work piece receiving means for collecting finished work pieces, and means operative when the loading head moves to its limit position adjacent the loading cradle for rendering said holding means inoperative to permit a work piece to move into the means for collecting finished work pieces.

8. In a lathe, in combination, a lathe bed, a spindle mounted in a headstock generally at one end of the lathe bed a loading cradle positioned concentric with said spindle and adjacent the other end of the lathe bed, a base member slidably mounted on horizontal ways on the lathe bed between first and second positions adjacent the spindle and loading cradle, respectively, and an intermediate index position, an upstanding loading head rotatably mounted on the base member and having a pair of diametrically opposed cylindrical tailstock extensions each of which is provided with a live center and a plurality of slidable work-engaging fingers concentrically disposed around and spaced from the live center for holding a work piece in engagement with said center, means for simultaneously shifting the fingers in both the tailstock extensions between work-engaging positions and withdrawn positions including a vertically disposed shaft in the loading head mounted for rotation therein and having a pinion intermediate its ends, a slidable disk-like member in each of said cylindrical extensions to which the fingers in the respective extensions are attached, a pair of racks associated one with each of said disk-like members and extending from the associated disk-like member in a direction opposite to that from which the fingers extend, said racks engaging opposite sides of said pinion, and means for rotating the vertically disposed shaft whereby to rotate the pinion and simultaneously move the racks in opposite directions whereby the fingers at opposite ends of the loading head will be simultaneously shifted into work-engaging positions or will be simultaneously drawn into retracted positions, means for indexing said loading head back and forth on the base member one-half revolution whereby the tailstock extensions alternate in presenting their associated fingers to the loading cradle and to the spindle, and means for moving the base member and loading head between said positions to take a rough work piece from the loading cradle and place it on the spindle and remove a finished work piece from the spindle.

9. A lathe as defined in claim 8 wherein the fingers are mounted for sliding movement against a hollow core in which said live center is mounted and disposed from the live center a distance whereby they define a circle having a diameter slightly greater than the diameter of a finished work piece and slightly less than the diameter of a rough work piece, said fingers being composed of material having spring characteristics and biased outwardly by said hollow core, means at the end of each finger forming a cam surface so that as the fingers are extended over a rough work piece by movement of the loading head they will be cammed onto said work piece, and means on each of said fingers defining a relieved portion inwardly of the work-engaging portion thereof which engages the hollow core when the fingers are extended over a finished work piece and permits radial inward movement of the fingers in order to permit engagement of the fingers with a finished work piece while avoiding sliding engagement between the fingers and fiinished work piece.

10. A lathe comprising, a lathe bed, a machining station, a loading station, a base member slidably mounted on ways on the lathe bed between positions adjacent the machining station the loading station and an intermediate index position, an upstanding loading head rotatably mounted on the base member and having a pair of tailstock extensions each of which is provided with a center and a plurality of movable work-engaging fingers disposed around and spaced from the center for holding a work piece in engagement with said center, means for simultaneously shifting the fingers in both the tailstock extensions between work-engaging positions and withdrawn positions including a vertically disposed shaft in the loading head mounted for rotation therein and having a pinion intermediate its ends, finger supporting means in each of said cylindrical extensions to which the fingers in the respective extensions are attached, a pair of racks associated one with each of said finger supporting means and extending from the associated finger supporting means in a direction opposite to that from which the fingers extend, said racks engaging opposite sides of said pinion, and means for rotating the vertically disposed shaft whereby to rotate the gear and simultaneously move the racks in opposite directions whereby the fingers at opposite ends of the loading head will be simultaneously shifted into work-engaging positions or will be simultaneously drawn into retracted positions, and means for indexing said loading head back and forth on the base member one-half revolution whereby the tailstock extensions alternate in taking a workpiece from the loading station and presenting a work piece to the machining station.

11. In a lathe, a lathe bed, a spindle at one end of the lathe bed and a loading cradle positioned concentric with said spindle and adjacent the other end of the lathe bed, a base member slidably mounted on ways on the lathe bed between the spindle and loading cradle and an intermediate index position, an upstanding loading head rotatably mounted on the base member and having a pair of tailstock extensions, each of which is provided with a center and a plurality of slidable work-engaging fingers disposed around and spaced from the center for holding a work piece in engagement with said center, and means for simultaneously shifting the fingers in both the tailstock extensions between work-engaging positions and withdrawn positions including a rotatably mounted shaft in the loading head and interconnecting means between said shaft and fingers for causing simultaneous movement of all the fingers in response to rotation of said shaft.

12. A lathe as defined in claim 11 wherein the fingers are mounted for sliding movement against a hollow core in which said center is mounted and disposed from the center a distance whereby they define a circle having a diameter slightly greater than the diameter of a finished work piece and slightly less than the diameter of a rough work piece, said fingers being composed of material having spring characteristics and biased outwardly by said hollow core, means at the end of each finger forming a cam surface so that as the fingers are extended over a rough work piece they will be cammed onto said work piece, and means for holding the fingers out of engagement with a finished work piece as the fingers are extended and moving the fingers radially inward after their extension in order to permit engagement of the fingers with a finished work piece while avoiding sliding engagement between the fingers and the finished work piece.

13. A work loading lathe including, a machining station, a loading head provided with a plurality of movable fingers for holding a work piece and transporting the work piece to the machining position, mechanism for holding rough work pieces in position to be picked up by said fingers including an inclined loading chute having means for receiving and guiding a plurality of rough work pieces placed one behind the other, and a loading cradle at the base of said chute having a plurality of members arranged to form a bottom and a side of the cradle while permitting movement of the fingers into engagement with a work piece supported thereby, means for causing work pieces to move one by one into said cradle including a pawl pivotally mounted for oscillation about an axis beneath the loading chute and near its base between first and second positions, said pawl in a first position having a first means for holding a work piece in the loading chute immediately above the loading cradle from movement into said cradle and a second means engageable with a work piece in the cradle for holding the work piece against the members forming the bottom and side of said cradle to accurately align the work piece, said pawl having a third means operative in its second position to block work pieces beyond the one immediately above the loading cradle from downward movement in said chute, while said first means permits a work piece immediately above the loading cradle to move from the chute into the cradle as the pawl moves from its first position to its second position, means for moving the pawl between its first and second position, and means for indicating the presence of rough work pieces in the loading chute.

14. A work loading lathe including, a machining station, a loading head provided with a plurality of movable fingers for holding a work piece and transporting the work piece to the machining station, mechanism for supplying rough work pieces to said fingers including an inclined loading chute having means for receiving and guiding a plurality of rough work pieces placed one behind the other, and a loading cradle beneath the base of said chute having a bottom, and means for causing work pieces to move one by one into said cradle including a pawl pivotally mounted for oscillation about an axis beneath the loading chute and near its base between two positions, said pawl in a first position having means for holding a work piece immediately above the loading cradle from movement into said cradle and means engageable with a work piece in the cradle for holding the work piece in said cradle, said pawl in its second position having means operative to block work pieces beyond the one immediately above the loading cradle from downward movement in said chute, while said first means permits a work piece immediately above the loading cradle to move from the chute into the cradle as the pawl moves from its first position to its second position.

15. In a lathe, a rough work piece loading station, a work piece machining station, elongated ways extending between the rough work piece loading station and the work piece machining station, a base member slidably mounted on said ways for movement between said stations and an intermediate index station, means including a tailstock rotatably mounted on said base member and extending parallel to said ways, said tailstock having a work piece engaging center and a plurality of work engaging fingers slidably mounted in the tailstock and disposed around and spaced from the center for holding the work piece in engagement with the center, means for indexing the tailstock on the base member about an axis normal to the ways to alternately present said tailstock to said loading and machining stations, means for shifting the base member between the loading and machining stations and the index station whereby a rough work piece held by the fingers may be removed from the loading station and by indexing of the tailstock a partial revolution and by movement thereof along the ways delivered to the machining station, and means for moving said fingers between work-holding and work-releasing positions independently of engagement of the center with a work piece.

References Cited in the file of this patent

UNITED STATES PATENTS

| | | |
|---|---|---|
| 1,790,848 | Smith et al. | Feb. 3, 1931 |
| 1,794,424 | Smith et al. | Mar. 3, 1931 |
| 1,799,106 | Laxo | Mar. 31, 1931 |
| 1,829,129 | Dillon | Oct. 27, 1931 |
| 1,936,401 | Lovely | Nov. 21, 1933 |
| 1,945,662 | Smith | Feb. 6, 1934 |
| 2,192,437 | Groene | Mar. 5, 1940 |
| 2,236,047 | Wattleworth | Mar. 25, 1941 |
| 2,605,538 | Cuttat | Aug. 5, 1952 |
| 2,623,429 | Meyer et al. | Dec. 30, 1952 |
| 2,656,754 | Treer | Oct. 27, 1953 |
| 2,711,817 | Hautau et al. | June 28, 1955 |